May 18, 1937. G. B. GALLASCH ET AL 2,080,851

SEXTANT

Filed May 28, 1935

GEORGE B. GALLASCH
HENRY F. KURTZ
INVENTOR

BY

ATTORNEYS

Patented May 18, 1937

2,080,851

UNITED STATES PATENT OFFICE 2,080,851

SEXTANT

George B. Gallasch and Henry F. Kurtz, Rochester, N. Y., assignors to Bausch & Lomb Optical Company, Rochester, N. Y., a corporation of New York Application May 28, 1935, Serial No. 23,885

4 Claims. (Cl. 240—2)

The present invention relates to bubble sextants and more particularly to means for adapting said sextants for night use.

One of the objects of the present invention is to provide an improved means for illuminating the bubble of a bubble sextant. Another object is to provide an improved means for recording the sextant reading. A further object is to provide a new form of illuminated marking pad. These and other objects and advantages reside in certain novel features of construction, arrangement and combination of parts as will hereinafter be more fully set forth and pointed out in the appended claims.

Referring to the drawing.

Figure 1:
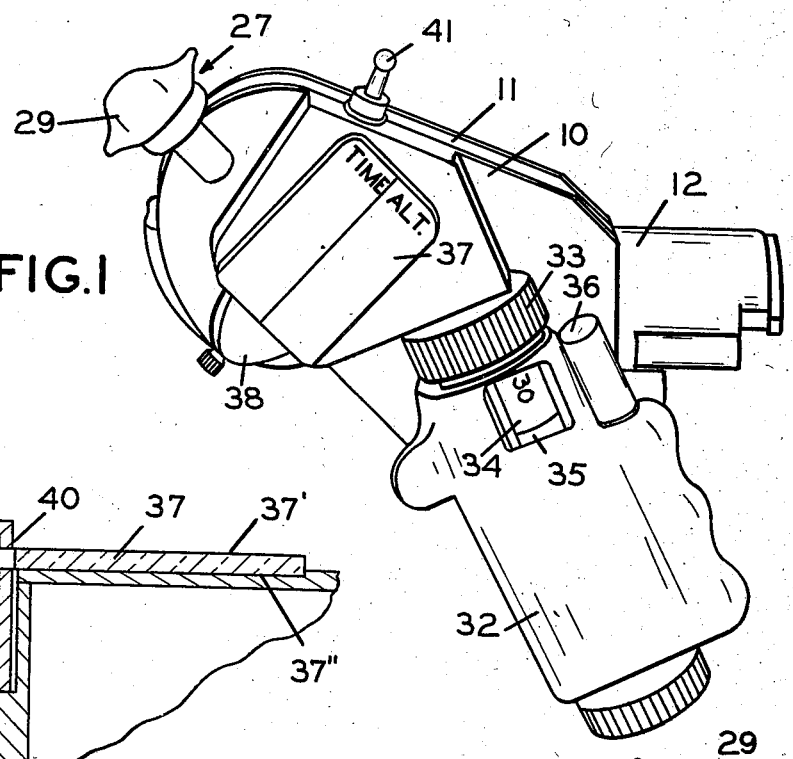
Fig. 1 is a perspective view of a sextant embodying this invention.
Figure 3:
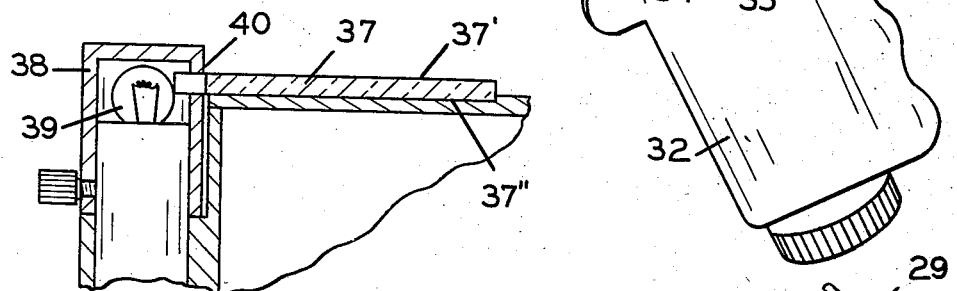
Fig. 3 is a fragmentary sectional view of the marking pad.
Figure 2:
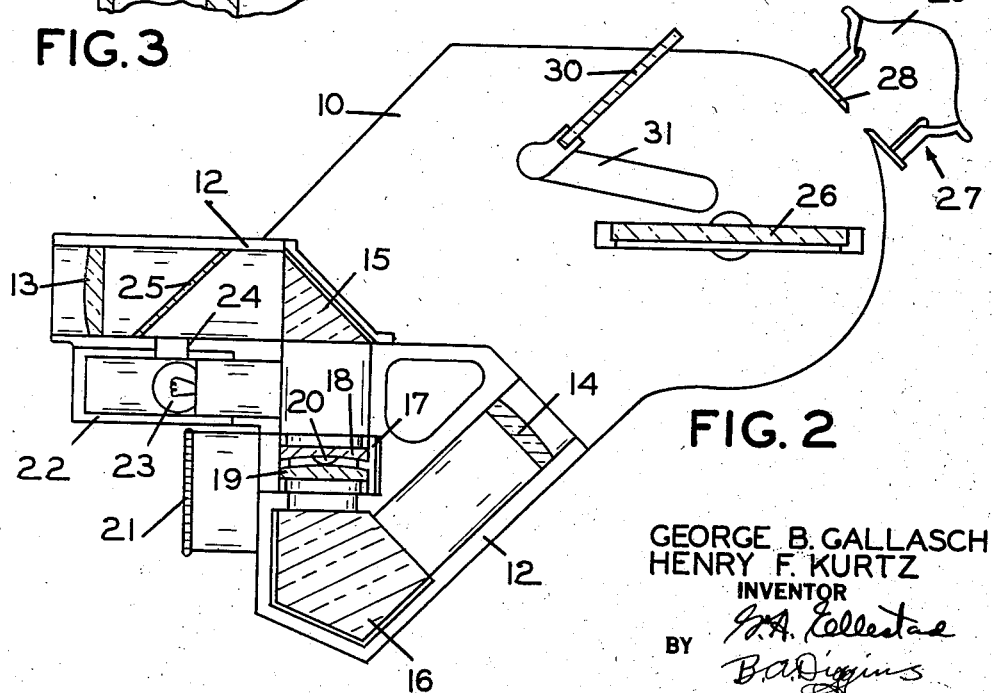
Fig. 2 is a vertical section of same.

One embodiment of this invention is illustrated in the drawing wherein 10 and 11 designate spaced supporting plates forming the body of the sextant. Between the plates 10 and 11 is a telescope 12 comprising lenses 13 and 14. Horizontal light rays are received by the lens 13 and are directed vertically downward by a prism 15 to a prism 16 which directs the light upward to the lens 14. A bubble chamber 17, enclosed by lenses 18 and 19, is located in the vertical portion of the telescope 12 between the prisms 15 and 16. The size of the bubble 20 is regulated by the knurled member 21 as is known in the art.

Parallel to the horizontal portion of the telescope 12 is a housing 22 within which is positioned a light source 23. An aperture 24 connects the housing 22 and the telescope tube and a transparent glass reflector 25 is fixed in the telescope tube in alignment with the aperture 24. Thus when viewing the horizon or using the bubble in daylight the glass reflector 25 permits the passage of sufficient light to illuminate the bubble. When the light source 23 is used, no adjustment is necessary beyond the switching on of the light.

A transparent index reflector 26 is tiltably mounted between the plates 10 and 11 and between the telescope 12 and an observation station 27 for bringing into coincidence the telescope image and the image of the object to be observed. The observation station 27 comprises an apertured plate 28 and an eye shield 29 for directing the sight along the optical axis of the telescope 12. A filter 30 is pivotally mounted on an arm 31 which is, in turn, pivotally mounted on the plate 10. This filter 30 is used when the altitude of a bright source, such as the sun or moon, is to be determined.

A hand grip 32 is fixed to the wall 10 and a knurled wheel 33, adjacent the top of the grip 32, serves to tilt the index reflector 26 to bring the image of the observed object and the telescope image into coincidence in the usual manner. A registering device 34, which is visible through the window 35 in the grip 32, is connected to the mechanism for tilting the index reflector 26 and indicates the altitude of the observed object. A housing 36 contains a light source, not shown, for illuminating the registering device.

Adjacent the hand grip 32 and secured to the wall 10 is a marking pad 37. This pad 37 comprises a sheet of glass having plane parallel surfaces, the upper one 37' of which is finely ground while the lower surface 37'' is silvered. A housing 38 containing a lamp 39 is provided with a slot 40 of substantially the same height as the thickness of the glass pad 37. The housing 38 is located so that the light from the lamp 39 enters the edge of the glass pad 37. In this way the pad 37 is illuminated so that marks on its surface will be visible at night. The light sources are all connected to a battery, not shown, but which may be located within the hand grip 32 and all are under the control of a suitable switch 41.

From the foregoing it will be apparent that we are able to attain the objects of our invention and provide a new and improved means for adapting a bubble sextant for night use. Various modifications can, of course, be made without departing from the spirit of our invention or the scope of the appended claims.

We claim:

1. A device of the character described comprising a body, a telescope fixed on said body, an index reflector adjustably mounted on said body in the path of the light rays from said telescope, a bubble level fixed in said telescope, a source of light fixed to said body in spaced relation to the telescope axis and a transparent reflector fixed in said telescope on the axis thereof for directing light from said source to said bubble level.

2. In a device of the character described a body, a telescope fixedly mounted on said body, an index reflector tiltably mounted on said body in the path of rays from said telescope, a bubble level fixed in said telescope, a source of light fixedly mounted on said body and spaced from the optical axis of said telescope, and a transparent reflector fixedly mounted in said telescope for directing light from said source along the optical axis of said telescope through said bubble level to said index reflector.

3. A device of the character described comprising a body member, an index reflector tiltably mounted on said body member, a telescope lens mounted on said body member with its axis horizontal, means for directing light from said objective vertically downward, means for directing the light from said first-named means upward at an angle to said index reflector, a bubble level carried by said body member in the vertical light path between said two means, a source of light carried by said body member adjacent said lens and a transparent reflector positioned between said lens and said first-named means for directing light from said source to said bubble level.

4. A device of the character described comprising a body member, a lens mounted on said member with its axis horizontal, a prism mounted on said body for directing the light from said lens vertically downward, a bubble level mounted below said prism, a second prism mounted below said bubble level for directing the light from said bubble level upward at an angle, a second lens positioned in the path of the light from said second prism, an index reflector tiltably mounted in the path of the light from said lens, a source of light mounted on said body member and a transparent reflector carried by said body for directing light from said source along the light path through said bubble level to said index reflector.

HENRY F. KURTZ.
GEORGE B. GALLASCH.